Figure 1:
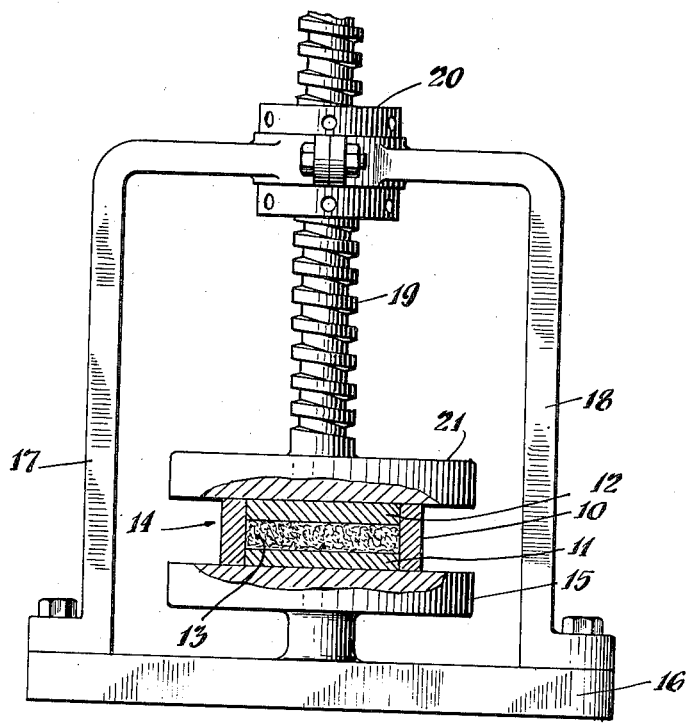

April 10, 1951  H. E. BOWERS  2,547,997
MOLDING FROM FIBER DISPERSIONS
Filed March 19, 1946

INVENTOR.
Harold E. Bowers
BY H. C. Dieserud
ATTORNEY

Patented Apr. 10, 1951

2,547,997

UNITED STATES PATENT OFFICE 2,547,997

MOLDING FROM FIBER DISPERSIONS

Harold E. Bowers, Pittsburgh, Pa., assignor to The New England Box Company, Greenfield, Mass., a corporation of Massachusetts Application March 19, 1946, Serial No. 655,582

7 Claims. (Cl. 92—55)

This invention relates to new and useful compositions molded from dispersions of fibrous materials, and method of producing such compositions.

It is an object of the invention to provide a wide variety of materials applicable to building and construction purposes and to various industrial and other uses. For example, there may be produced in accordance with my invention a line of molded wood products which comprise reconstructed or reintegrated wood and the reintegrated wood products may be caused to simulate the characteristics of original wood as to nailing and sawing properites and, if desired, the apparent density may be predetermined and controlled so that woodlike products having the lightness and apparent density of balsa wood or the apparent density of the heaviest woods may be produced. In fact, products may be produced from wood, sawdust or the fibers or pulp of wood the apparent densities of which may be even less than balsa wood and these products, depending on what is desired, may range in apparent density from such light material as mentioned through and beyond the range of apparent densities ordinarily encountered in the heavier woods; it being possible to produce woodlike products heavier and more dense than oak.

It is a further object of the invention to produce molded products of various, and, if desired, predetermined, apparent densities from dispersions of a wide variety of fibrous materials. Such fibrous materials may be classified as plant fibers or inorganic fibers. As examples of plant fibers which may be utilized to produce materials in accordance with the invention the following may be mentioned: mechanically pulped wood, flax straw, pita floja fiber, sisal fiber, abaca fiber and hemp fiber. So, it may be said the invention is applicable to plant fibers in general. As examples of inorganic fibers which may be utilized in accordance with the invention to produce certain compositions of desired apparent densities and other desirable characteristics the following may be mentioned: fibers of the asbestos type, rock wool, paligorskite or other fireproof or fire-resistant fibrous materials. Products made according to the invention from this type of fibers are well suited for heat insulation where high temperatures are encountered.

Hence a further object of the invention is to produce materials of predetermined apparent densities which are molded from dispersions of organic or inorganic fibers or mixtures of these.

To accomplish these desirable ends and others which will appear from the description hereinafter, the invention comprehends the molding of sheets, blocks, or other forms and shapes from a liquid dispersion of fibers of the kind mentioned after there has been added a subliming filler agent to the dispersion; which filler agent is removed from the molded product by sublimation after excess liquid has been removed from the molded product, the process being carried out in such fashion that the resulting product may be caused to have any desired predetermined apparent density.

According to one manner of practicing the invention, the fibers of the starting material are dispersed in water. There is then intimately mixed with the dispersion, a quantity of a finely divided or comminuted subliming filler agent. This dispersion containing the fibers and the filler agent is then filtered and cast in a mold where excess water separates from the molding (using that term as a substantive). Preferably the molding is produced in a constant volume mold. The molding, which still contains some water, is then further dried by evaporating the moisture therefrom. By reason of the selection at the outset of a filler agent which will sublime at a temperature below that at which the fibers might be harmed, the molding may then be subjected to a temperature which will cause the filler to sublime, thus leaving a product having its molded shape but nevertheless having within the body thereof as voids or pores, the spaces which had previously been occupied by the filler agent. Consequently by selection at the outset of the kind and amount of fibers and the kind and amount of filler agent there may be produced a wide variety of products for a wide variety of uses and these various products may be produced in a wide range of apparent densities.

As mentioned above the selection of the kind of fibrous material to start with will depend upon the characteristics desired in the final product. For example, a product which may ultimately be used as an insulator and subjected to high temperatures would require a fiber not harmed at such temperatures, asbestos fiber being well suited. On the other hand, if the temperature encountered is low, for example, in refrigerators, plant fibers would be suited.

The selection of the filler agent will depend largely upon the characteristics desired in the ultimate product and upon the kind of fibers used. The filler agent, speaking generally, should have the characteristics of high vapor pressure at the temperature to which the molded product is subjected for sublimation and a relatively high melting point, that is to say, a melting point which will not be reached during the sublimation process. Also, the subliming filler agent should be insoluble in the liquid in which the fibrous material is dispersed for molding. For example, if the dispersion liquid is water a filler agent should be selected which is not water soluble. Ordinarily, a filler agent which has a high vapor pressure somewhere in the range between room temperature and 150° C. is well suited for practising my invention as I have found that the plant fibers suitable for the production of articles contemplated by the invention will withstand such temperature without undue weakening or disintegration of the fibers. In the practice of my method I have successfully used naphthalene, which has a melting point of 80° C., and camphor, which has a melting point of 176° C., as filler agents but other materials having like characteristics may, of course, be substituted.

In carrying out the molding step of my process I preferably use a constant volume mold, as distinguished from a constant pressure mold. And for illustrative purposes I have shown in the drawing, in more or less diagrammatic fashion, one form of such a constant volume mold. As shown in the drawing (Fig. 1) the mold itself comprises a continuous side wall 10, which may have any desirable shape. In this instance it is cylindrical. Fitting snugly but removably within the cylinder 10 is a base plunger 11 and a top plunger 12, the space between the plungers 11 and 12 forming a mold cavity 13. The mold, designated generally by reference character 14, rests upon a base 15 secured to a frame base 16 from which extend upwardly the standards 17 and 18. The standards are designed to mount a jackscrew 19 for rotation, the screw being raised or lowered by turning the mounting collar 20. A jackscrew base 21 is secured to the lower end of the jackscrew.

Figure 2:
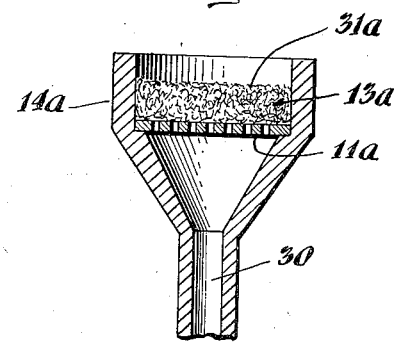

Ordinarily in the commercial practice of my invention a more elaborate form of molding apparatus might be used but the apparatus disclosed will suffice for illustrative purposes to show one form of constant volume mold for carrying out my process. It may be used as a constant volume mold as follows:

First, a predetermined quantity of fibers and filler dispersed in a liquid is charged to a preforming mold which is in essence a suction filter. Such a preformer is shown more or less diagrammatically in Fig. 2. It may be noted that the cross-section of the preform cavity 13a will conform to the cross-section of the cavity 13 of the mold 14. When the dispersion is charged to the preform cavity the fibers will be caught on the removable foraminous bottom 11a of the preformer 14a and excess water may be sucked through discharge outlet 30. This will cause the fibers to interlace and felt in random orientation, such a felted web being indicated by reference character 31a.

The jackscrew 19 is raised, the upper plunger 12 of the mold 14 is removed and the felted web with excess water removed but containing a predetermined quantity of fibers and filler intermixed is then transferred to the mold cavity 13. The upper plunger 12 is then placed in the cylinder. The jackscrew is then caused to move down until the base 21 abuts the upper plunger 12. When the bottom of the base 21 abuts the top of the cylinder 10 of the top of the plunger 12 is flush with the top of the cylinder and the bottom of the plunger 11 is flush with the bottom of the cylinder. Since the plunger 12 will not then be forced further down, the mold cavity 13 remains constant. So much pressure as is required to force the upper plunger 12 to its flush position is exerted but in any event the ultimate molding is done at constant volume. When the contents of the mold cavity 13 have been molded to this constant volume, the fibers have become laid and compressed in random orientation. The molding, still containing some residual water, may then be removed and subsequently dried. The drying may be done at room temperature, sufficient time being allowed to evaporate substantially all water present. If a filler agent has been used which requires a temperature higher than room temperature for effective sublimation of the filler, then the molding may be heated to the desired temperature in a chamber, preferably in a current of heated air or some other gas. The sublimation step is carried out until the molding reaches constant weight and this leaves a molding of the shape and volume of the mold, the apparent density of which will have been predetermined by the amounts of fibrous material and filler charged to the mold at the outset.

Not only is my method of constant volume molding applicable to dispersions of fibers in which there is also contained a filler agent but it may also be used to advantage in molding from dispersions of fibers without subliming filler agents or in molding from dispersions of fibers with or without binding agents.

Although the novel features which are believed to be characteristic of the invention will be pointed out in the claims appended hereto, the invention itself as to its objects and advantages and the manner in which it may be carried out may be better understood by reference to the following addition disclosure in which is set forth various examples.

*Exampe I*

The following is given as one example of the application of my invention:

If it is desired to produce a molding which will have an apparent density comparable to that of balsa wood, the volume of the mold cavity, comparable to the mold cavity 13 in the drawing, may be 81.9 cc. as an example. This is the volume of the cavity which remains when both plungers 11 and 12 are completely embedded in the mold and at this stage further compression ceases. Let us assume that 10.8 g. of mechanical wood pulp should remain in the finished molding. This may be obtained by using 540 g. of a 2% aqueous dispersion of the wood pulp. The apparent density of the final product will be $10.8/81.9 = 0.132$ g./cc., which is comparable to that of balsa wood. The density of wood substance is approximately 1.5. Hence, the volume occupied by 10.8 g. of wood substance amounts to $10.8/1.5 = 7.2$ cc. Therefore, the total void volume in the mold must amount to $$81.9 - 7.2 = 74.7 \text{ cc.}$$

This desired result is achieved by incorporating with the pulp dispersion a finely ground subliming filler which is just sufficient in amount to fill the required void volume. Naphthalene may be used as the subliming filler. Since the density of naphthalene is 1.145 g./cc., the quantity of naphthalene which will be required to fill the void space will be $74.7 \times 1.145 = 85.5$ g. The molding mixture will then consist of the following:

540.0 g. of 2% aqueous ground wood pulp dispersion 85.5 g. naphthalene.

The naphthalene is finely ground before being intimately mixed with the pulp dispersion. Fine grinding can be readily achieved if the naphthalene is first moistened with ethyl alcohol. The molding mixture or dispersion thus produced is then filtered with suction through a funnel which is shaped in such a way as to preform the felted web which results from filtration. The shape of the preform is such that it can be snugly inserted in the finishing mold (comparable to mold 14) without disturbance of the felted web. Compression can then be effected with the use of a pressure as high as is available. It is not meant to imply that low pressures are not effective for this purpose, but rather that the higher the pressure which is used the larger the quantity of water which can be expressed from the molding at the outset. Pressures mounting to several thousand pounds per square inch have been used for compressing these moldings although lower pressures could have been used. However, due to the high moisture absorption of the fibrous material which comprises the molding mixture, a single compression generally does not suffice to close the mold. During the first compression the mold usually cannot be completely closed. If, therefore, the molding is removed after an initial compression and then dried until most of the remaining water has evaporated, it can then be molded again with further compression. If the second compression does not suffice to close the mold, the molding can then be removed for a further period of drying and a third compression will probably succeed in closing the mold. After the mold has been completely closed, that is, when the mold cavity has reached constant volume, the molding may then be removed for final drying.

Finally the molding is dried to equilibrium with the moisture content of the atmosphere with little or no heating. After it is dried to equilibrium as mentioned, it may then be transferred to an oven in which the temperature is maintained at a level slightly below the melting point of naphthalene which is approximately 80° C. This causes a sublimation of the naphthalene and a period of several hours or days in the heating oven may be required for the complete elimination of the naphthalene from the molding. If the temperature is allowed to rise above the melting point of the naphthalene, an undesirable staining of the molding may occur but no staining is observed as long as the temperature remains below the melting point of the naphthalene.

The sublimation step is continued for sufficient time to cause the finished molding to reach constant weight, and this end may be reached more rapidly if a current of heated air is passed over the molding during the sublimation step.

The finished product will have the fibers felted in random orientation and will have an apparent density comparable to that of balsa wood.

*Example II*

If it is desired to prepare a molding having an apparent density of about 0.5 g./cc. which would be comparable to that of white pine, the proportions of the molding composition may be calculated as follows:

In this instance a mold was used the mold cavity of which has a volume of 50.3 cc. Hence the required weight of wood substance will amount to about 30 g. In this instance wood fibers in the form of a 6% gelatinized wood dispersion in water were used. Hence 500 g. of this 6% dispersion is required in order to obtain 30 g. of wood. The density of wood substance is approximately 1.5 and hence the volume of required wood substance is 30/1.5=20 cc. Accordingly, the volume of the mold cavity remaining to be filled is 60.3−20=40.3 cc. The density of naphthalene is equal to 1.145 and hence the quantity of naphthalene required to fill 40.3 cc. is 40.3×1.145=46.1 g. Therefore, 500 g. of gelatinized wood (6%) dispersion is mixed with 46.1 g. of finely divided naphthalene. The dispersion mixture is felted with suction to produce a preformed web and then the preformed web is compressed (without heating) in the mold having a mold cavity of 60.3 cc. The felted web is molded to constant volume, that is, 60.3 cc., after which the molding is seasoned at room temperature, and after the wood in the molding has been dried, the temperature of the molding is raised in order to remove the naphthalene by sublimation as described in Example I.

The finished molding will have an apparent density comparable to that of white pine and will have good nailing and sawing properties.

*Example III*

If it is desired to prepare a molding having an apparent density comparable to that of white oak, the calculation of the molding composition for a mold having a mold cavity of 60.3 cc. will be as follows:

It will require about 42 g. of wood substance and this may be obtained from a dilute dispersion of wood pulp or gelatinized wood. In either case the wood will be in the form of a dilute aqueous dispersion. Wood substance in the amount of 42 g. molded to a volume of 60.3 cc. will produce a product having an apparent density of 42.0/60.3=0.70 g./cc. which is comparable to that of white oak. Since the density of wood substance is about 1.5, the volume occupied by 42.0 g. of wood substance will amount to 42.0/1.5=28.0 cc. The required void volume will, therefore, be 60.3−28.0=32.3 cc. Hence, the quantity of naphthalene required to fill the void volume will be (since the density of naphthalene is 1.145) 32.3×1.145=37.9 g.

The steps of mixing, molding, drying and sublimation are then carried out as described in the foregoing examples.

In the foregoing examples naphthalene was used as the subliming filler agent but the process has been carried out in the same way by using camphor as the subliming filler agent, taking into account the density and melting point of camphor. Inasmuch as the camphor has a melting point of 176° C., the subliming step may be carried out at a temperature of 150° C. or even higher but the melting point temperature should not be exceeded. Likewise in the following examples camphor may be used instead of naphthalene, and other subliming agents meeting the requirements of vapor pressure, melting point and non-solubility in the liquid dispersion, may, in certain instances, be substituted within the contemplation of the invention.

*Example IV*

Asbestos fibers in the amount of 16 g. were mixed with 87.3 g. of naphthalene which had been finely ground with sufficient ethyl alcohol to moisten it. The mixture was effected by dispersing the asbestos and naphthalene in 1000 cc. of water with rapid stirring. This dispersion was filtered through a preforming mold to get rid of the bulk of the water. The preformed web conforming to the shape of the finishing mold was then molded to constant volume in a mold having a mold cavity of 81.9 cc. in the manner described in the foregoing examples. The molding molded to a volume of 81.9 was then permitted to dry for three days at room temperature. It was then heated three days at a temperature between 75° C. and 80° C. to sublime the naphthalene. The resulting molding was a porous, felted product having an apparent density of about 0.2 g./cc. This product is well adapted for use as an insulation material and especially for high temperature insulation.

*Example V*

Paligorskite in the amount of 16.4 g. was mixed with 88.2 g. of finely divided naphthalene. This mixture was effected by dispersing the paligorskite and naphthalene in 1820 cc. of water with rapid stirring. This dispersion was then preformed in a filter mold of the same conformation as the finishing mold to get rid of the bulk of the water. The felted preformed molding was then removed to the finishing mold having a mold cavity of 81.9 cc. The molding was compressed to this volume as described in the foregoing. After drying at room temperature for three days, the molding was then heated in an oven through which was passed a current of air, the temperature in the oven being maintained at 75° C. to 80° C. to sublime the naphthalene. When the molding reached constant weight it had an apparent density of 0.24 g./cc. It was light and porous. It is admirably suited as an insulation material.

It will be seen from the foregoing description and examples that the process of my invention comprehends a method of molding of fibrous products at constant volume as distinguished from constant pressure and also a method of casting the fibers together with a filler agent from a liquid dispersion to lay the fibers in random orientation so that the fibers become interlaced and felted, the felted web then being compressed to a fixed and predetermined volume by the application of such pressure as may be required, after which the compressed shape is treated to remove the filler agent. The invention lends itself to the manufacture of a wide variety of useful products ranging from very highly porous to very dense structures made either of plant of mineral fibers. If desired, a product simulating wood as to apparent density, nailing and sawing qualities may be made or very porous, soft, feltlike lightweight products of predetermined apparent density may be made, such products being particularly useful for insulation and soundproofing purposes.

The terms and expressions which have been employed herein are used as terms of description and not of limitation and there is no intention in the use of such terms and expressions of excluding any equivalent of the features shown and described or portions thereof, but it is recognized that various modifications are possible within the scope of invention claimed.

What is claimed is:

1. The method of producing an article of manufacture of the character described having a predetermined apparent density which comprises providing a mold of predetermined volume, providing an aqueous dispersion of a predetermined quantity of feltable fibrous material derived from wood with which is intimately intermixed a predetermined quantity of a comminuted, water insoluble filler agent having a melting point not substantially exceeding 176° C. and a vapor pressure below its melting point sufficiently high to sublime, forming a felted web of the mixture of fibrous material and filler agent from the dispersion while removing the bulk of the water therefrom, compressing the web of fibrous material and interspersed filler agent in said mold to said predetermined volume to form a shape of said predetermined volume, drying the compressed shape by evaporating residual water and then heating the shape to a temperature not exceeding the melting point of the filler agent but high enough to cause its removal by sublimation, said predetermined quantity of fibrous material in said dispersion being that which when said web is compressed to said shape and the residual water removed and the filler agent is sublimed off the shape will have said apparent density and said predetermined quantity of filler agent in said dispersion being just sufficient to fill the spaces between the fibrous material when said shape is compressed to said predetermined volume.

2. The method of producing an article of manufacture of the character described having a predetermined apparent density which comprises providing an aqueous dispersion of a predetermined quantity of wood fibers with which is intimately intermixed a predetermined quantity of finely divided naphthalene, forming a felted web of the mixture of fibrous material and naphthalene from the dispersion while removing the bulk of the water therefrom, compressing the mixture of fibers and naphthalene to form a shape of given volume, removing residual water from the compressed shape and then heating the shape to a temperature approaching but not exceeding the melting point of the naphthalene thereby to remove the naphthalene and produce a compressed shape of predetermined apparent density, said predetermined quantity of wood fibers being that which, when said compressed shape has the residual water and naphthalene removed, the shape will have said predetermined apparent density and said predetermined quantity of finely divided naphthalene being just sufficient to fill the spaces between the fibers when said shape is compressed to said given volume.

3. The method of producing an article of manufacture of the character described having a predetermined apparent density which comprises providing an aqueous dispersion of a predetermined amount of feltable fibrous material derived from wood with which is intimately intermixed a predetermined amount of a finely divided, sublimable, water insoluble filler agent, forming a water-laid preformed felted web of the fibrous material with the filler agent intermixed therethrough from said dispersion while removing the bulk of the water therefrom, compressing the preformed web to a given volume to form a shape of intermatted fibers and filler agent of predetermined volume, removing residual water from said shape by evaporation and removing the filler agent from the shape by sublimation to produce voids in the spaces of the shape initially occupied by the filler agent, said predetermined amount of fibrous material being that which, when said compressed shape has the residual water and the naphthalene removed, the shape will have said predetermined apparent density and said predetermined amount of finely divided filler agent being just sufficient to fill the voids between the fibrous material when said shape is compressed to said predetermined volume.

4. The method of producing an article of manufacture of the character described having a predetermined apparent density which comprises providing a mold of predetermined volume, providing an aqueous dispersion of gelatinized wood fibers with which is intimately intermixed a quantity of finely divided naphthalene, forming a water-laid preformed felted web of the wood fibers with the naphthalene intermixed therethrough from said dispersion while removing the bulk of the water therefrom, compressing the preformed web to said predetermined volume to form a shape of intermatted wood fibers and interspersed naphthalene having said predetermined volume, the amount of wood fibers forming said shape being that which, when said shape is dried and the naphthalene removed as hereinafter specified, the shape will have a weight corresponding to said predetermined apparent density and the amount of finely divided naphthalene in said shape being just sufficient to fill the void spaces between fibers in said shape, removing residual water from said shape by evaporation and removing naphthalene from the shape by heating the shape to sublime the naphthalene thereby to produce a porous structure of interlaced wood fibers having said predetermined apparent density.

5. The method of producing an article of manufacture having woodlike characteristics and predetermined apparent density which comprises providing a mold of predetermined volume, providing an aqueous dispersion of mechanically pulped fibers with which is intimately intermixed a predetermined quantity of a comminuted sublimable, water insoluble filler agent, forming a water-laid preformed felted web of the fibers with the filler agent intermixed therethrough from said dispersion while removing the bulk of the water therefrom, the amount of said fibers in said web being that which, when compressed to said predetermined volume in said mold, will produce a molding having a weight corresponding to said apparent density when said molding is dried and the filler sublimed and the amount of comminuted sublimable material being just sufficient to fill the void spaces in the molding when said fibers are compressed to said predetermined volume, compressing the preformed web to said predetermined volume to form a shape of intermatted fibers and filler agent having said predetermined volume, removing residual water from said shape by evaporation and removing the filler agent from the shape by sublimation to produce voids in the spaces of the shape initially occupied by the filler agent thereby to produce said article having said predetermined apparent density.

6. The method of producing an article of manufacture of the character described having a predetermined density which comprises providing an aqueous dispersion of a predetermined amount of feltable fibers derived from wood with which is intermixed a predetermined amount of a finely divided, solid, water insoluble filler agent having a vapor pressure sufficiently high at temperatures below 150° C. to sublime, forming a water-laid, felted shape from said mixture by removing the bulk of the water from said dispersion and compressing said water-laid, felted shape to predetermined volume, removing residual water from said compressed felted shape and removing said filler from said shape by sublimation at a temperature below 150° C., said above mentioned mixture containing an amount of fibers which, when formed into said shape and the shape is compressed to said predetermined volume and dried and the filler sublimed, will have said predetermined apparent density and said mixture containing an amount of finely divided filler just sufficient to fill the spaces in said shape between said fibers when said shape is compressed to said predetermined volume.

7. A method of producing an article of manufacture of the character described having a predetermined apparent density which comprises providing an aqueous dispersion of a predetermined amount of fibrous material derived from wood and a predetermined amount of finely divided, water insoluble filler agent having a melting point not substantially exceeding 80° C. and a vapor pressure sufficiently high at 70° C. to sublime when heated to that temperature, preforming a molding of intermixed water-laid, felted fibers and filler agent from said dispersion while removing the bulk of the water, then compressing said preformed molding to predetermined lesser volume, thereafter drying said water-laid, felted molding and then subjecting the molding to a temperature not exceeding the melting point of said filler agent but high enough to cause said agent to sublime and leave as voids the spaces initially occupied by said agent in the molding, said predetermined amount of fibrous material in said dispersion being that which, when said molding is so compressed, dried and the filler sublimed off, will have said predetermined apparent density and said predetermined amount of finely divided filler in said dispersion being just sufficient to fill the spaces between said fibrous material when the molding is so compressed.

HAROLD E. BOWERS.

REFERENCES CITED

The following references are of record in the file of this patent:

UNITED STATES PATENTS

| Number | Name | Date |
|---|---|---|
| 819,595 | Prins | May 1, 1906 |
| 1,344,324 | Walter | June 22, 1920 |
| 1,623,989 | Wikkula | Apr. 12, 1927 |
| 1,740,280 | Bryant | Dec. 17, 1929 |
| 1,760,446 | Skolnik | May 27, 1930 |
| 1,896,190 | Smith et al. | Feb. 7, 1933 |
| 2,120,137 | Mason | June 7, 1938 |
| 2,332,369 | Burton | Oct. 19, 1943 |
| 2,397,936 | Glidden et al. | Apr. 9, 1946 |

FOREIGN PATENTS

| Number | Country | Date |
|---|---|---|
| 238,615 | Great Britain | Aug. 21, 1925 |

OTHER REFERENCES

Paper Trade Journal, Oct. 2, 1913, pages 54 and 56.